United States Patent [19]

Torikata

[11] Patent Number: 5,290,575
[45] Date of Patent: Mar. 1, 1994

[54] APPARATUS AND METHOD FOR BAKING BREAD

[75] Inventor: Yasuo Torikata, Imaichi, Japan

[73] Assignee: Rheon Automatic Machinery Co., Ltd., Utsunomiya, Japan

[21] Appl. No.: 31,134

[22] Filed: Mar. 12, 1993

[30] Foreign Application Priority Data

Aug. 28, 1992 [JP] Japan .................. 4-253693

[51] Int. Cl.$^5$ .................. A21D 8/00; H05B 6/00
[52] U.S. Cl. .................. 426/233; 99/328; 99/451; 99/DIG. 14; 219/686; 219/730; 219/708; 426/243; 426/523
[58] Field of Search ............... 426/231, 233, 243, 523; 99/328, 451, 472, DIG. 14; 219/10.55 E, 10.55 M; 34/1 P

[56] References Cited

U.S. PATENT DOCUMENTS 5,019,412  5/1991  Hattori .................. 99/451
5,128,158  7/1992  Chartrain et al. .................. 426/523

FOREIGN PATENT DOCUMENTS 56-23565  6/1981  Japan .
56-31933  7/1981  Japan .

Primary Examiner—George Yeung
Attorney, Agent, or Firm—Sughrue, Mion, Zinn, Macpeak & Seas

[57] ABSTRACT

A baking apparatus and a method for quickly providing freshly baked bread by reducing time required for baking. In bread-making operations, reducing baking time by using a dough-surface heating unit together with an dough-interior heating unit and then subjecting the baked bread to reduced pressure for lowering moisture content at the dough interior.

25 Claims, 4 Drawing Sheets

APPARATUS AND METHOD FOR BAKING BREAD

BACKGROUND OF THE INVENTION

1. Field of the Invention

The present invention relates to an apparatus for baking bread and other baked goods, and more particularly, to the apparatus having a dough-surface heating unit a dough-interior heating unit, and a pressure reduction unit for quickly providing freshly baked bread with proper baking color. The present invention also relates to a method for baking bread and other baked good.

2. Description of the Related Art

Center areas and surface areas of baked goods such as breads and cakes have different properties and qualities. Center areas are resilient, although outer areas are stiffer and brittler. Center areas are also moister than the drier surface areas. Both center areas and surface areas are porous, but the pores of center areas are larger and coarser than those of surface areas. The brown color typical of baked goods forms on the surface areas. The process that gives the center and surface areas of breads and cakes these special properties is called baking.

Conventional methods for baking bread and other baked goods usually include baking dough in ovens having a conductive heating unit which heats the dough externally to provide baked goods with the above special properties. There has been known a problem with such conventional ovens in that they require a long time to bake dough because of the low heat conductivity of dough caused by air bubbles contained therein and the drying process involved with baking dough, which takes place in addition to the heating process and is time consuming in conventional ovens. Generally, to bake a roll or similar small baked good in conventional conductive heating ovens (which uses dough-surface heating only) requires 15 minutes whereas to bake a larger item requires 40 minutes or more.

Attempts to increase baking speeds in conventional conductive heating ovens are further frustrated by the need to maintain temperature ranges at the surface of dough required for obtaining good baking color (the appetizing, usually brown, color on surface areas of baked goods which are baked with traditional baking methods). If these temperatures are exceeded in an attempt to quickly bake dough, the end product will be either burned on the outside, unbaked on the inside, or both.

To reduce baking time, there has been known a microwave oven for heating leavened dough to produce such baked goods as breads. The microwave oven heats the interior of dough with microwaves.

Further, there has been proposed a microwave oven which is provided with an electric or gas heating unit.

Another example of prior art related to production of leavened foods is described in Japanese Laid-open Patent S56-23565. This publication discloses heating dough at its interior and subjecting the dough to reduced pressure. However this technique concerns only heating of foods and not baking of foods.

Also, as another example of related art, refer to Japanese Laid-open Patent S56-31933 for information about a manufacturing process for cakes and breads involving reduced cooling by pressure reduction for preventing surface cooling and volume reduction.

SUMMARY OF THE INVENTION

Although the above described conventional microwave oven successfully heats the interior of dough in a short time and also effectively promotes conversion of $\beta$-type starch into $\alpha$-type starch, it affects the dough in a manner similar to boiling. That is, even though microwaves reduce time required for heating, they do not provide to the surface of dough proper coloring associated with baking. Because this apparatus heats the dough with microwaves only, baked goods are not produced with appetizing surface colors appropriate for increasing the appeal of baked goods.

In this connection, the microwave oven provided with the external heating unit may solve this problem. That is, such oven heats dough in a shorter time than conventional ovens while also providing a proper baking color to the surface of the dough. However, a further problem has been known with this microwave oven in which it requires excessive time to reduce the moisture content at the interior of the baked good. That is, bread directly after being removed from the oven has a soft outer surface and a gummy, sticky center because the moisture content of the dough is not sufficiently reduced. Drying is essential to producing good quality baked goods. If the interior of dough is heated by microwaves, but the dough or baked good is not also dried, the resultant baked good will lack the special qualities of fresh-baked goods and will be unpalatable. If the baked goods are further dried to improve their quality, the time required for this drying will cancel out any time savings produced by using microwaves for heating, and ultimately no time savings is realized.

According to the pressure reduction in the microwave open described in Japanese Laid-open Patent S56-23565, unless the surface of dough acquires a good baking color, baked goods do not attain the flavor and sensation of oven-baked goods produced by baking with conventional methods. Also, with this technique the lowering of the boiling point which accompanies reductions in pressure might obstruct conversion of $\beta$-type starch into $\alpha$-type starch.

As noted above, the properties of bread dough prevent reductions in baking time by dough-surface heating only. Dough-interior heating only can reduce heating time, but can not obtain good baking color particular to quality breads and cakes. A combination of dough-surface heating and dough-interior heating provides hot baked goods with good baking color, but total baking time remains inconveniently long because time required to sufficiently reduce the moisture content in the dough remains long.

It is therefore, an object of the present invention to overcome the above-described drawbacks, and to provide a baking apparatus and method that applies dough-surface heating together with dough-interior heating to quickly provide breads and cakes with the specific structures such as good baking color required of good quality baked goods.

These and other objects of the present invention will be attained by providing a baking apparatus for baking foods, comprising a casing, a dough-surface heating means, a dough-interior heating means, a decompressor and a control means. The casing defines therein a baking chamber where a dough of the food is placed. The dough-surface heating means is connected to the baking chamber for heating the dough from the exterior thereof and providing baking color to the surface thereof. The dough-interior heating means is connected to the baking chamber for heating the dough from the interior thereof. The decompressor is connected to the baking chamber for reducing a pressure within the baking chamber and subsequently causing evaporation of moisture from the dough. The control means is connected to the dough-surface heating means, the dough-interior heating means and the decompressor for controlling operations thereof.

Further, in the present invention, there is provided a method of baking food comprising the steps of (a) placing a dough of the food in a baking chamber, (b) heating an outer surface of the dough by a dough-surface heating means for providing the dough with baking color at the surface thereof, and heating an interior of the dough by microwaves for internally heating the dough and for removing a moisture content therefrom, and (c) subjecting the dough to a reduced pressure environment in the identical baking chamber for facilitating reduction of the moisture content within the dough.

During or after the dough-interior heating processes by the dough-interior heating means, the baked goods are subjected to reduced pressure to increase evaporation, so moisture content in the dough is rapidly reduced. After one series of operations is complete, depending on the condition of the baked goods, they may again be subjected to dough-interior heating and reduced pressure to further adjust the moisture content. The present invention can produce appetizing baked goods in baking times shorter than required for conventional baking methods.

The energy levels for dough-interior heating and dough-surface heating are set according to the amount of dough and the baking color required for the end product. The dough is then heated. In a preferred embodiment, heating is stopped by a signal from a timer or the baking color sensor. Reduced pressure level and period are set taking the quality desired for the baked goods into consideration. The duration of pressure reduction is set using the timer. When exact moisture content control is required, a weight sensor is provided. The amount of moisture evaporated from the baked goods is controlled according to the measured weight of the baked goods. To this effect, after performing one series of operations, microwave irradiation and pressure reduction operations may again be performed.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
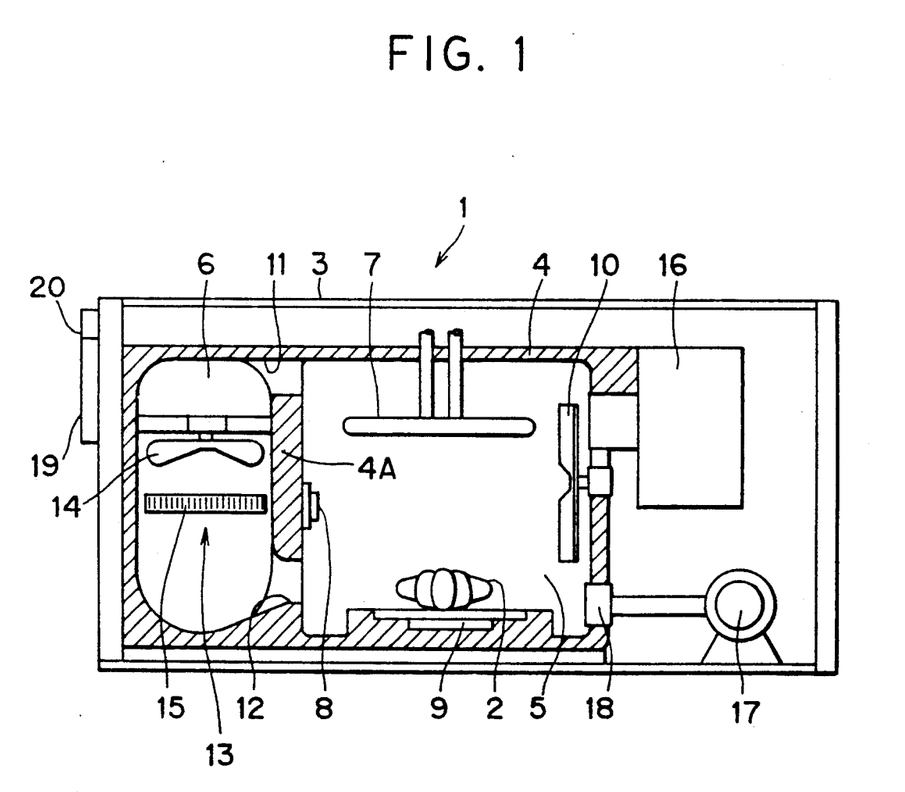
FIG. 1 is a schematic cross-sectional view showing a bread baking apparatus according to a first embodiment of the present invention.

A baking apparatus according to a first embodiment of the present invention will be described with reference to FIG. 1.

The baking apparatus 1 for baking dough 2 includes an outer casing 3 and an inner casing 4 having a partition wall 4A which divides an interior of the inner casing 4 into a baking chamber 5 for holding the dough 2 and a hot air recirculation chamber 6. The inner casing 4 is of air tight construction.

In the baking chamber 5, an electric heating element 7 is installed for heating the dough 2. Further, a baking color sensor 8 and a weight sensor 9 are provided in the baking chamber 5. The baking color sensor 6 detects the baking color at the surface of the dough 2 and the weight sensor 9 detects the weight of the dough 10. Furthermore, a stirrer 10 is rotatably supported in the baking chamber 5 for stirring microwaves. A pressure sensor (FIG. 2) is also disposed in the baking chamber 5.

The partition wall 4A is formed with a hot-air inlet and a hot-air outlet 12 for providing fluid communication between the baking chamber 5 and the hot air recirculation chamber 6. In the hot-air circulation chamber 6, there is provided a hot air circulation unit 13 including a circulating fan 14 and an air heating element 15. The fan 14 is adapted for drawing air from the baking chamber 5 through the hot-air inlet 11, propelling the drawn air over the air heating element 15 to further heat the air, and pushing the further heated air back into the baking chamber 5 via the hot-air outlet 12. Other types of dough-surface heating units, such as gas heaters, can be used in the present invention without adversely affecting heating operations. The above described hot air circulation unit 13 in the chamber 6 and the electric heating element 7 form an external dough-surface heating unit for heating the surface of the dough 2.

A magnetron 16 is fixed to the inner casing 4 and is positioned on an outer side thereof to apply microwaves for heating the interior of the dough 2. The stirrer 10 promotes distribution of the microwaves generated from the magnetron 16. The magnetron 16 and the stirrer 10 form the dough-interior heating unit.

A decompressor 17 is also positioned on the outer side of the inner casing 4 for evacuating the baking chamber 4 and reducing the pressure therein to a preset range. The decompressor 17 is isolatable from the baking chamber 5 by a decompressor isolation valve 18.

Figure 2:
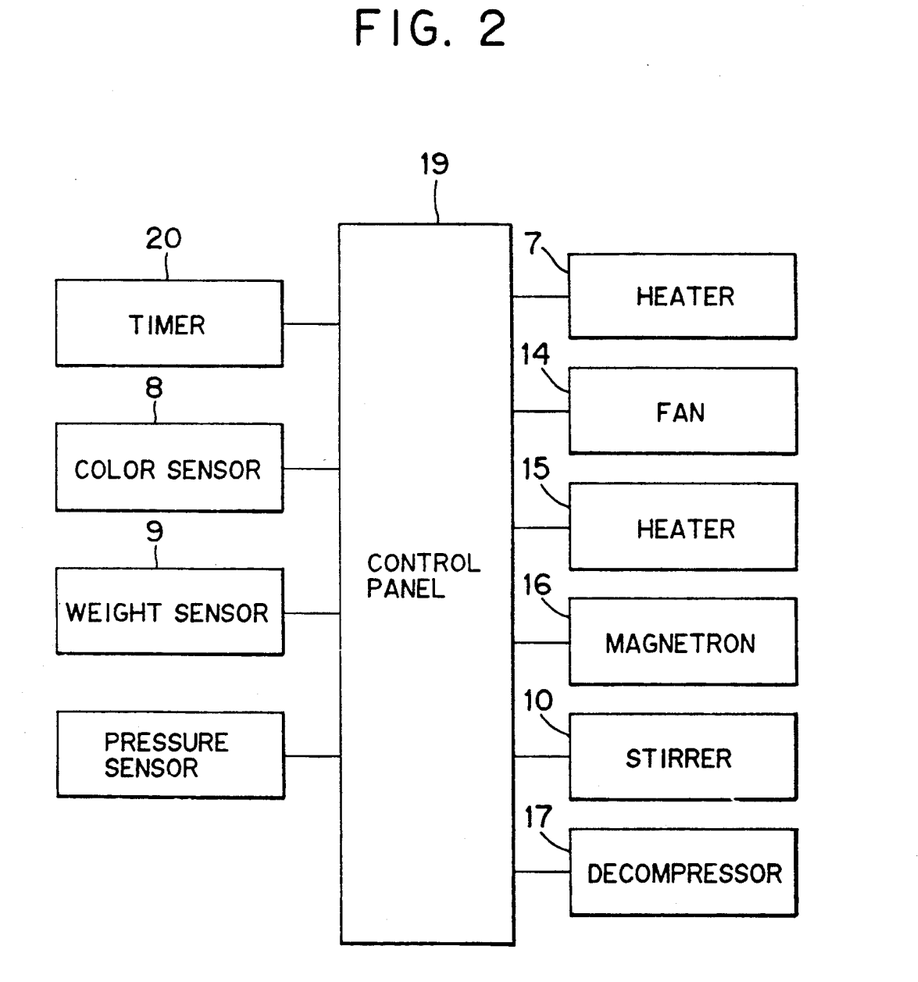
FIG. 2 is a block diagram showing an electrical circuit in the bread baking apparatus according to the first embodiment.

A control panel 19 and a timer 20 are provided on an outer surface of the outer casing 3. As shown in FIG. 2, the timer 20, the color sensor 8, the weight sensor 9, and the pressure sensor are connected to an input side of the control panel 19. On the other hand, the heating element 7, the fan 14, the heater 15, the magnetron 16 the stirrer 10 and the decompressor 17 are connected to an output side of the control panel 19. The control panel 19 is adapted for generating start-up and stop signals to the hot-air circulation unit 13, the electric heating element 7, the magnetron 16, and the decompressor 17. The control panel 19 also controls pressure conditions provided by the decompressor 17. The timer 20 controls start-up timings of the hot-air recirculation unit 13, the electric heating element 7, the magnetron 16 and the decompressor 17, and the duration of time at which the hot-air circulation unit 13, the electric heating element 7 and the magnetron 16 operate and the duration at the reduced pressure environment.

The baking operation can be divided into a heating operation for heating the dough and providing its surface with baking color, and a pressure reduction operation for increasing the speed at which the dough dries. The hot-air recirculation unit 13, the electric heating element 7, and the magnetron 16 are started to begin the heating operation by the manipulation to the control panel 19. During heating operations the decompressor 17 is actuated to start the pressure reduction operation so that pressure in the baking chamber 5 is reduced. The pressure range to which pressure in the baking chamber 5 is reduced is preset at the control panel 19, and the time duration at the reduced pressure environment is preset at the timer 20. Both the pressure range and the time duration of the reduced pressure environment are set as required for properly drying the dough 2 into bread or other baked good.

The baking color sensor 8 is adapted for detecting predetermined baking color stored through the control panel 19. When the baking color sensor 8 detects the predetermined baking color, the sensor 8 transmits a signal to the control panel 19 to stop heating operation by the electric heating element 7 and the hot air recirculation unit 13. Further, the weight sensor 9 is adapted for detecting a preset weight of the dough 2. In accordance with the drying operation, water content in the dough 2 is removed, so that the weight of the dough 2 is reduced to the preset weight. When the weight sensor 9 detects the preset weight, the sensor 9 transmits a signal to the control panel 19 to stop microwave heating and pressure reduction. Incidentally the baking color sensor 8 can be dispensed with. In that case, operating period of the electric heater element 7 and the hot air circulation unit 13 are set optimumly by the timer 20.

Pressure reduction conditions are set to obtain the highest quality baked goods possible. In an ordinary baking the start and duration of pressure reduction are set at the timer 20 in compliance with a weight of the dough 2 or initial water content ratio in the dough 2. However, providing the weight sensor 9 can obtain more exact control of moisture content. By detecting the weight of the dough 2 while it bakes and stopping the pressure reduction or resetting the pressure reduction period for repeated pressure reduction according to changes in weight of the dough, the amount of moisture evaporated from the baked goods can be finely controlled.

Figure 3:
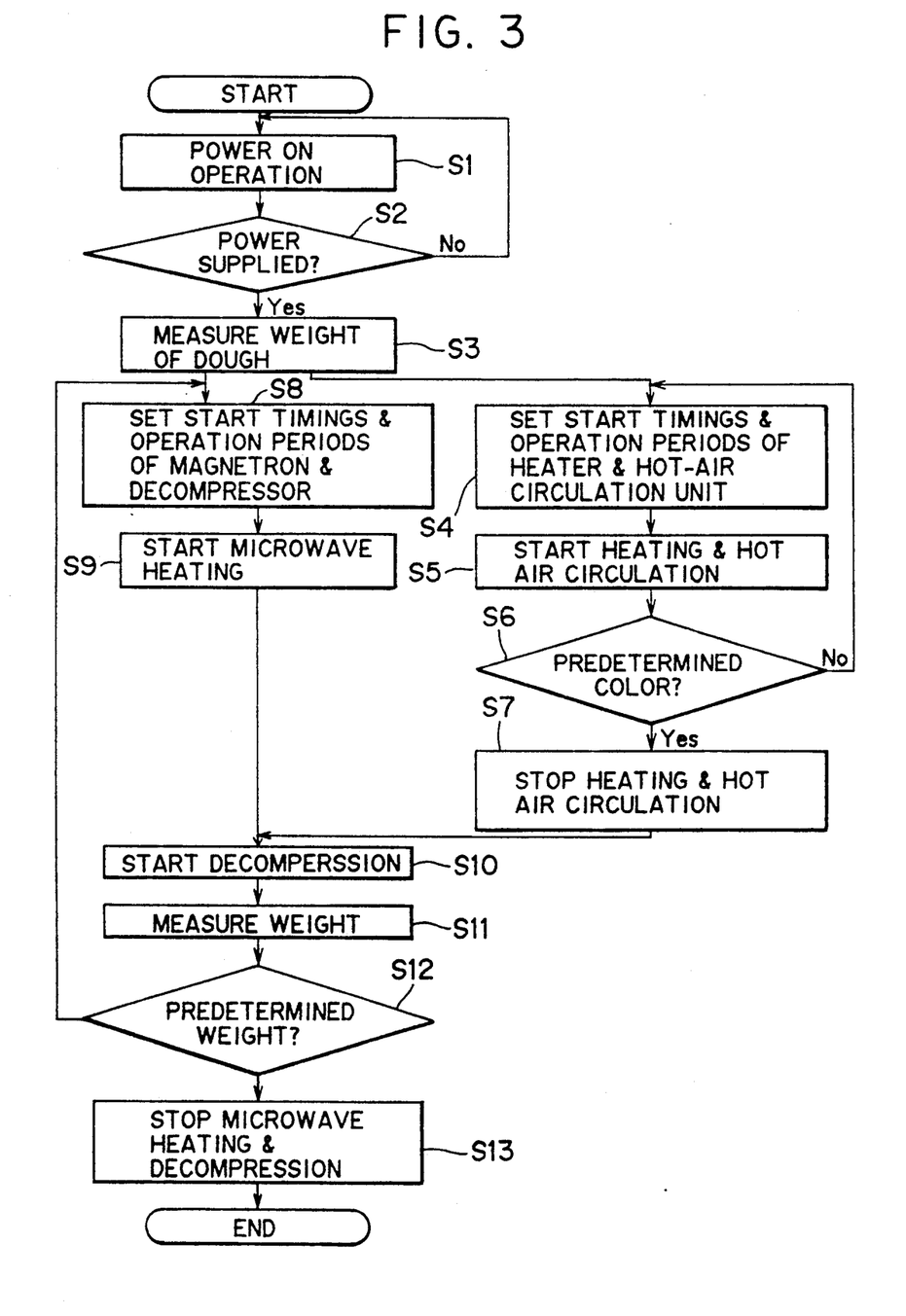
FIG. 3 is a flowchart showing an operational routine according to the first embodiment.

FIG. 3 shows a control routine of the bread baking apparatus using the color sensor 8 and the weight sensor 9 for precise control to the moisture contained in the food. In Step S1, power ON operation is carried out, and in Step S2, judgment is made as to whether or not the power is supplied to the apparatus. Then in Step S3, weight of the dough is measured. Next, the dough surface heating (external heating) is performed through Steps S4 to S7 and at the same time, the dough internal heating is carried out at Steps S8 and S9. For the dough surface heating, in Step S4, operation start timing and operation period of the heater 7 and the hot air circulation unit 13 are set in the time 20, and in Step S5, the dough surface heating is performed. In Step S6, judgment is made as to whether or not the dough has a predetermined baked color. If judgment falls Yes, the routing goes to Step S7 so that the dough surface heating is terminated, and a routine goes into a step S10. On the other hand, in the Step S6, if the dough does not have the predetermined baked color, the procedure returns back to the Step S4, where the start timing and period for the dough surface heating is again set.

In the Step S8, microwave heating start timing and period and pressure reduction start timing and period are set in the timer. Then, in Step S9, microwave heating by the magnetron 16 is started. Next, in Step S10, pressure reduction is started by the operation of the decompressor 17. In step S11, weight of the heated dough is measured by the weight sensor 9. This measurement is carried out without any influence from the fluid pressure due to the hot air recirculation. In Step S12, if the weight of the dough reaches a predetermined weight, the routine goes into step S13 so that the microwave heating and decompression are stopped. On the other hand, if the weight of the dough does not reach the predetermined level, i.e., moisture content in the dough is not released to a predetermined level, the routine goes back to the Step S8, where the microwave heating start timing and its period and decompression start timing and its period are again set.

The present invention as described in the first embodiment combines pressure reduction with heating both the interior and surface of dough, rapidly heats dough interior by microwaves, thereby increasing the amount of moisture evaporated from the baking dough, and rapidly applies baking color to the surface of baked goods. Also adjusting the output of microwaves when heating frozen dough can prevent uneven thawing at the interior thereof, subsequently preventing uneven baking caused by such uneven thawing to provide a high quality baked good.

Figure 4:
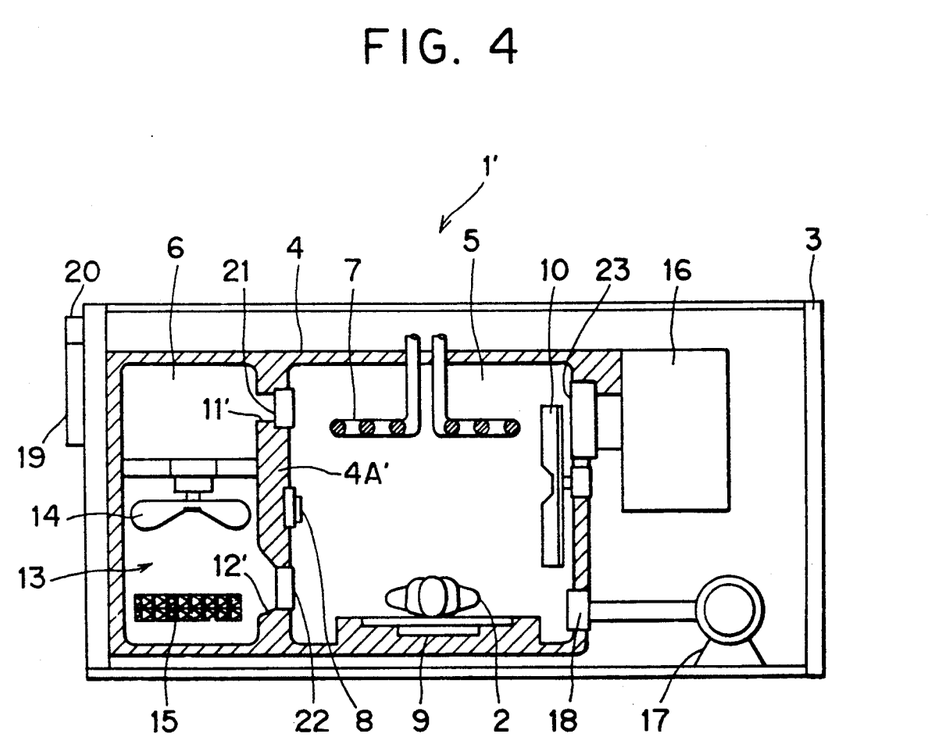
FIG. 4 is a schematic cross-sectional view showing a bread baking apparatus according to a second embodiment of the present invention.

FIG. 4 is a cross-sectional diagram showing a bread baking apparatus 1' according to a second embodiment of the present invention. The apparatus 1' in the second embodiment is generally the same as the apparatus 1 in the first embodiment except that atmosphere isolation valves 21 and 22 are provided at hot air inlet 11' and hot air outlet 12', respectively, for isolating the baking chamber 5 from the hot air circulation chamber 6 when these valves 21 and 22 are closed. Also, in the second embodiment an additional atmosphere isolation valve 23 is provided between the magnetron 16 and the baking chamber 5.

In operation, heating is started when the atmosphere isolation valves 21 and 22 are opened to start operation of the hot-air circulation unit 13, and the atmosphere isolation valve 23 is opened to start operation of the magnetron 16. When preset time period preset by the timer 20 has been elapsed, the timer 20 transmits a signal to the control panel 19, which in turn transmits a signal for stopping the heating operation. Similar to the first embodiment, if the baking color sensor 8 is used, when the sensor 8 detects a predetermined baking color of the dough 2, the sensor 8 transmit a signal to the control panel 19 for stopping the heating operation.

Afterward, atmosphere isolation valves 21, 22 and 41 are closed for providing air-tight condition in the baking chamber 5. The decompressor isolation valve 18 is then opened to start decompression in the chamber 5 by the decompressor 17. The decompressor 17 evacuates the baking chamber 5 to reduce pressure therein. Similar to the first embodiment, the pressure range to which pressure in the baking chamber 5 is reduced is preset at the control panel 19, and the time duration at the reduced pressure environment is also preset at the timer 19.

Both the pressure range and the time duration are set as required for properly drying the dough 2 into bread or other baked good. Ordinarily, reducing pressure for 30 seconds is sufficient to evaporate moisture to appropriate levels, after which about five seconds is required to return pressure in the baking chamber 5 to atmospheric pressure.

When exact control of moisture content in the dough is required, the magnetron 16, but not the hot-air circulation unit 13 nor the electric heating element 3, can only be again started for a duration of time as determined by information from the weight sensor 9. That is, the weight sensor 9 measures the weight of the dough 2 before and after the initial heating operation and pressure reduction operation, and compares the two weights to determine the amount of moisture evaporated from the dough. When moisture has not been sufficiently evaporated as determined by the loss in weight (moisture) of the dough 2, pressure is then again reduced to further evaporate moisture to required levels. In this case, duration and level of pressure reduction is determined according to the weight of the baked good. For example, one or two grams more or less in moisture content influences the quality of a 35 to 45 g croissant. The second pressure reduction reduces the moisture level, for example, this one to two grams of moisture.

Because with the second embodiment, pressure reduction can be performed in the baking chamber directly after heating, there is no need, as there is in conventional baking apparatuses, for troublesome procedures such as removing the baked products and transferring them to a pressure reduction chamber for pressure reduction. This also prevents damage to the shape of the baked goods.

EXAMPLE 1

The present inventor performed an experiment in accordance with the first embodiment. In the experiment shaped, leavened, and frozen croissant dough (40 g) was heated with a gas heating element (230° C.) as the dough-surface heating unit instead of an electric heating element, and a magnetron (2450 Mhz, rated output 600 W) as the dough-interior heating unit. To insure that the frozen dough thawed evenly, the first 30 seconds of the one minute and 15 seconds of heating prior to the start of pressure reduction was performed with microwave output at 100 W. The remaining 45 seconds of heating prior to reducing pressure was performed with microwave output raised to 600 W. One minute and 15 seconds after starting the dough-surface heating unit and the dough-interior heating unit, the decompressor 17 was started to reduce air pressure in the baking chamber 5 from atmospheric pressure to 400 mm Hg. Heating until the surface and interior of the croissant was sufficiently heated required 45 seconds after start of pressure reduction. The entire baking process was complete in two minutes total after start of heating. The baked croissant weighed 32 g, which is 8 g less than the frozen croissant dough before baking. The baked croissant had the same qualities as croissants baked with conventional methods. Reducing the pressure lowers the boiling point, which increases the effectiveness and speed at which moisture in the dough evaporates so that baking speed increases. Pressure should be reduced after heating has caused sufficient conversion of $\beta$-type starch into $\alpha$-type starch. Reducing pressure too early on in the heating process could obstruct conversion of $\beta$-type starch into $\alpha$-type starch. Incidentally, when pressure was not reduced at all, an extra minute of baking time was required.

In addition to the experiment described above, the present inventor performed an experiment where butter roll dough (40 g) was baked under the same conditions as described above. A baked butter roll was obtained with quality as high as that of butter rolls baked with conventional baking apparatuses.

EXAMPLE 2

The present inventor performed an experiment in accordance with the second embodiment. In the experiment, shaped, leavened, and frozen croissant dough (35 to 40 g) was heated with a gas heating element (230° C.) as the dough-surface heating unit, and a magnetron (2450 Mhz, rated output 600 W) as the dough-interior heating unit. Heating was continued for two minutes thirty seconds until good baking color was obtained.

Lowering air pressure to 400 mm Hg took five seconds if the baking chamber 5 was empty. Under this condition, the heated croissant in the baking chamber 5 was sufficiently dried 10 seconds after starting pressure reduction to produce baked goods with the same qualities as those of baked goods baked with conventional methods. Baking was complete within three minutes after start of heating. Further, same result was obtained in case of baking butter roll dough having a weight of 35 to 40 g. Incidentally, baking similar amounts of dough in conventional ovens would require 15 to 18 minutes.

The above examples clearly show the present invention can provide a large reduction in baking time over conventional baking methods. Recent developments in frozen dough and post-leavening/freezing technologies have reduced times required for pre-baking operations in the production of such baked goods as bread. Methods for reducing actual baking times have been unsuccessfully sought in the past, but the present invention generates large reductions in baking times. Breads and cakes on display at bakeries can be provided to customers freshly baked with almost no wait. Also baking times of small and medium size breads and cakes at production factories can also be reduced and production efficiency raised thereat. As per the above explanation, the present invention greatly contributes to industries involved with producing and selling breads, cakes and other foods.

As described in the present invention, combining a dough-interior heating unit with a pressure reduction unit increases moisture evaporation in porous materials such as bread dough, cake, and other confectioneries.

While the invention has been described in detail and with reference to specific embodiments thereof, it would be apparent to those skilled in the art that various changes and modifications may be made therein without departing from the spirit and scope of the invention. For example, by the precise control to the moisture content in the dough, a relay circuit or a microprocessor is available.

What is claimed is:

1. A baking apparatus for baking foods, comprising:
   a casing defining therein a baking chamber where a dough of the food is placed;
   a dough-surface heating means connected to the baking chamber for heating the dough from the exterior thereof and providing baking color to the surface thereof;

a dough-interior heating means connected to the baking chamber for heating the dough from the interior thereof;

a decompressor connected to the baking chamber for reducing a pressure within the baking chamber and subsequently causing evaporation of moisture from the dough; and control means connected to the dough-surface heating means, the dough-interior heating means and the decompressor for controlling operations thereof.

2. The baking apparatus as claimed in claim 1, further comprising a heating completion determination means connected to the control means for determining when the dough is heated to a predetermined level.

3. The baking apparatus as claimed in claim 2, wherein the heating completion determination means comprises a timer for stopping heating after heating is performed for a predetermined duration of time.

4. The baking apparatus as claimed in claim 3, wherein the heating completion determination means further comprises a baking color sensor for detecting a predetermined baking color of the dough and for generating a signal indicative of termination of the operation of the dough-surface heating means.

5. The baking apparatus as claimed in claim 4, further comprising a pressure reduction completion determination means connected to the control means.

6. The baking apparatus as claimed in claim 5, wherein the pressure reduction completion determination means comprises the timer for stopping pressure reduction by the decompressor after pressure reduction is performed for a predetermined duration of time.

7. The baking apparatus as claimed in claim 6, wherein the pressure reduction completion determination means further comprises a weight sensor for detecting a weight of the dough and for generating a stop signal to stop pressure reduction by the decompressor when a predetermined amount of moisture has been evaporated from the dough.

8. The baking apparatus as claimed in claim 7, wherein the dough-interior heating means comprises a magnetron for microwave heating to the dough.

9. The baking apparatus as claimed in claim 8, wherein the casing has a partition wall for dividing an interior of the casing into the baking chamber and a hot air recirculation chamber, a hot air inlet and a hot air outlet being formed in the partition wall for allowing fluid communication between the baking chamber and the hot air recirculation chamber.

10. The baking apparatus as claimed in claim 9, wherein the dough surface heating means comprises a heater disposed in the baking chamber for heating the dough, and hot air recirculation unit disposed in the hot air recirculation chamber for recirculating hot air within the baking chamber.

11. The baking apparatus as claimed in claim 10, wherein the hot air recirculation unit comprises:

a circulating fan for drawing an air from the baking chamber through the hot air inlet; and a second heater disposed below the circulating fan for further heating the drawn air, the circulating fan propelling the further heated air back into the baking chamber through the hot air outlet.

12. The baking apparatus as claimed in claim 8, wherein the casing has a partition wall for dividing an interior of the casing into the baking chamber and a hot air recirculation chamber, and the apparatus further comprising at least two isolation valves disposed on the partition wall for selectively isolating the baking chamber from the hot air recirculation chamber for facilitating air tight arrangement in the baking chamber, one of the isolation valves serving as a hot air inlet when opened and the other isolation valve serving as a hot air outlet when opened.

13. The baking apparatus as claimed in claim 12, further comprising a third isolation valve provided between the magnetron and the baking chamber for selectively and airtightly isolating the magnetron from the baking chamber and a fourth isolation valve provided between the decompressor and the baking chamber for selectively and airtightly isolating the decompressor from the baking chamber.

14. The baking apparatus as claimed in claim 13, wherein the dough surface heating means comprises a heater disposed in the baking chamber for heating the dough, and hot air recirculation unit disposed in the hot air recirculation chamber for recirculating hot air within the baking chamber.

15. The baking apparatus as claimed in claim 14, wherein the hot air recirculation unit comprises:

a circulating fan for drawing an air from the baking chamber through one of the isolation valves on the partition wall; and a second heater disposed below the circulating fan for further heating the drawn air, the circulating fan propelling the further heated air back into the baking chamber through the other isolation valve on the partition wall.

16. A method of baking food comprising the steps of:

placing a dough of the food in a baking chamber;

heating an outer surface of the dough by a dough-surface heating means for providing the dough with baking color at the surface thereof, and heating an interior of the dough by microwaves for internally heating the dough and for removing a moisture content therefrom; and subjecting the dough to a reduced pressure environment in the baking chamber for facilitating reduction of the moisture content within the dough.

17. The method as claimed in claim 16, wherein the outer surface heating step comprises the step of setting a start timing and heating period of the dough-surface heating means by a timer.

18. The method as claimed in claim 17, wherein the outer surface heating step further comprises the step of detecting a baking color of the outer surface; and resetting the timer if the detected baking color does not reach a predetermined baking color.

19. The method as claimed in claim 18, wherein the internal heating step comprises the step of setting a start timing and heating period of the microwave generation.

20. The method as claimed in claim 19, wherein the pressure reduction step comprises the step of setting start timing and period for the pressure reduction by the timer.

21. The method as claimed in claim 20, wherein the heating step is performed during the pressure reduction step.

22. The method as claimed in claim 21, wherein the pressure reduction step further comprises the steps of detecting a weight of the dough;

resetting the start timing and period of the microwave generation and the pressure reduction if the weight of the dough does not reach a predetermined level; and again performing the interior heating and pressure reduction in accordance with the resetting.

23. The method as claimed in claim 20, wherein the pressure reduction step is performed after the heating step.

24. The method as claimed in claim 16, wherein the dough is bread dough.

25. The method as claimed in claim 16, wherein the dough is frozen dough.

* * * * *